United States Patent
Sasaki

(12) 
(10) Patent No.: US 6,332,007 B1
(45) Date of Patent: Dec. 18, 2001

(54) AUTOMATIC FREQUENCY CONTROL IN FSK RECEIVER USING VOLTAGE WINDOW DEVIATION

(75) Inventor: Teruo Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/210,538

(22) Filed: Dec. 14, 1998

(30) Foreign Application Priority Data

Dec. 12, 1997 (JP) ................................................ 9-362623

(51) Int. Cl.[7] .................................................. H04L 27/16
(52) U.S. Cl. .................... 375/344; 375/334; 455/192.2; 455/182.2; 329/302
(58) Field of Search .................................. 375/344, 334; 455/192.2, 182.2; 329/300, 302

(56) References Cited

U.S. PATENT DOCUMENTS

| | | | |
|---|---|---|---|
| 4,669,094 | * 5/1987 | Van Rumpt | 375/334 |
| 4,736,458 | * 4/1988 | Lommers | 455/192.2 |
| 5,402,446 | 3/1995 | Minami | 375/344 |
| 5,548,619 | * 8/1996 | Horike et al. | 375/344 |
| 5,633,898 | * 5/1997 | Kishigami et al. | 375/344 |

FOREIGN PATENT DOCUMENTS

| | | |
|---|---|---|
| 0 599 409 A2 | 11/1993 | (EP) . |
| 1331111 | 9/1973 | (GB) . |
| 2 280 801 | 2/1995 | (GB) . |
| 58-189631 | 12/1983 | (JP) . |
| 60-125021 | * 4/1985 | (JP) . |
| 10-257109 | 9/1988 | (JP) . |
| 6-54005 | 2/1994 | (JP) . |
| 7-183924 | 7/1995 | (JP) . |
| 8-107428 | 4/1996 | (JP) . |
| 8-237316 | 9/1996 | (JP) . |

OTHER PUBLICATIONS

British Search Report dated Apr. 1, 1999.

Japanese Office Action dated Jan. 4, 2000 with partial translation.

* cited by examiner

*Primary Examiner*—Temesghen Ghebretinsae
(74) *Attorney, Agent, or Firm*—McGinn & Gibb, PLLC

(57) ABSTRACT

An AFC circuit for controlling an oscillation frequency of a local oscillator is disclosed. An f/V converter converts a frequency of an FSK signal to a received signal voltage varying depending on the frequency of the FSK signal. A window generator generates a voltage window including a reference voltage corresponding to a center frequency of the FSK signal. The oscillation frequency of the local oscillator is controlled depending on a deviation of the received signal voltage from the voltage window so that the received signal voltage falls into the voltage window.

33 Claims, 12 Drawing Sheets

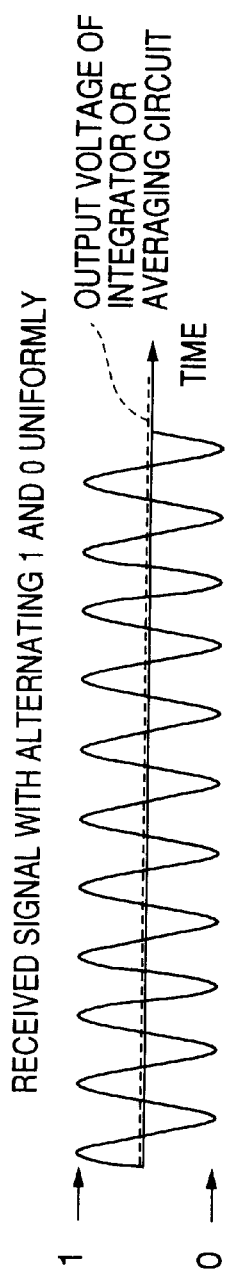
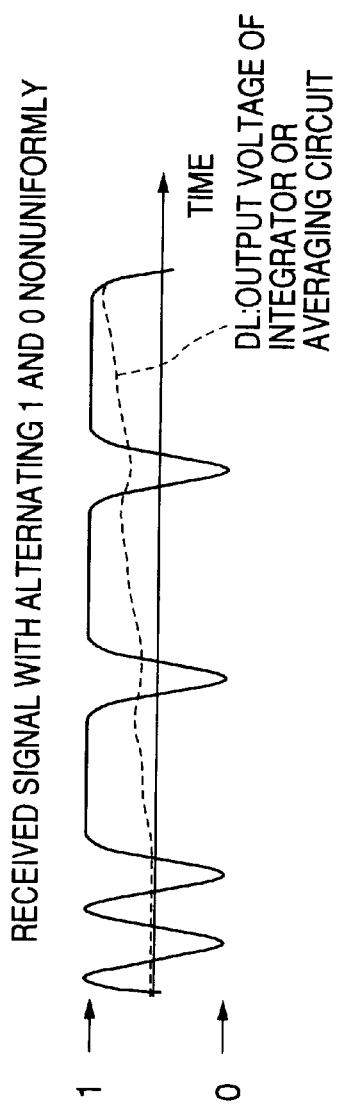
FIG. 1A (PRIOR ART)
FIG. 1B (PRIOR ART)

AUTOMATIC FREQUENCY CONTROL IN FSK RECEIVER USING VOLTAGE WINDOW DEVIATION

BACKGROUND OF THE INVENTION

1. Field of the Invention

The present invention relates to an FSK (frequency shift keying) receiver for receiving an FSK-modulated signal and demodulating it into a baseband signal and, in particular to an automatic frequency control technique for use in the FSK receiver.

2. Description of the Prior Art

In general, there are two types of FSK receivers: superheterodyne type and direct-conversion type. They are both provided with a frequency converter and a frequency-to-voltage (f/V) converter. The frequency converter mixes a received FSK signal to a local oscillation signal of a local oscillator. Thereby, the received FSK signal is converted to a second FSK signal of an intermediate frequency. Thereafter, the frequency of the second FSK signal is converted into a voltage that varies according to a change in frequency of the second FSK signal. In general, an f/V converter has a conversion characteristic such that the output voltage increase as the frequency of an FSK signal increases and decreases as it decreases (see FIG. 5). Therefore, the f/V converter can be used to demodulate the FSK signal to produce a baseband signal.

In such an FSK receiver, a frequency drift occurring in a local oscillator can be one of factors that deteriorate receiving status conditions. The frequency drift may be caused by a change in accuracy and/or temperature of the local oscillator. Therefore, an auto frequency control (AFC) technique is employed to cause the local-oscillation frequency to pull in a proper frequency.

A conventional AFC circuit will be described hereinafter with these conventional superheterodyne and direct-conversion receivers having the f/V conversion function.

In a superheterodyne FSK receiver, the output voltage of the f/V converter is input to an integrator where it is averaged. The average is input to a voltage comparator, which compares it to a reference voltage. Then, when the output voltage of the integrator is higher than the reference voltage as the result of the comparison, the voltage comparator raises the local-oscillation frequency of the local oscillator so that the output voltage of the integrator becomes equal to the reference voltage. On the other hand, when the output voltage of the integrator is lower than the reference voltage, the voltage comparator lowers the local-oscillation frequency of the local oscillator so that the output voltage of the integrator becomes equal to the reference voltage. In this case, the reference voltage is a voltage corresponding to the center frequency of the second FSK signal obtained by the frequency converter. In this manner, the conventional AFC circuit uses the integrator and a voltage comparator to perform the automatic frequency control.

Such a conventional AFC circuit can be also applied to a direct-conversion FSK receiver, an example of which has been disclosed in Japanese Patent application Laid-open No. 08-107428. This direct-conversion FSK receiver is provided with a first local oscillator and a second local oscillator. The first local oscillator is used to directly convert the radio-frequency FSK signal into baseband I and Q signals. The second local oscillator is used to up-convert the baseband I and Q signals into an intermediate-frequency signal. Such a system was proposed by WEAVER et al. (Proceedings of The IRE, Jun. 25, 1956, p. 1703-).

The output signal of the second local oscillator is input to a first f/V converter and the intermediate-frequency signal is input to a second f/V converter. The first output voltage of the first f/V converter and the second output voltage of the second f/V converter are compared by a voltage comparator. The output of the voltage comparator is averaged and then the averaged voltage is used to control the frequency of the first local oscillator.

Another conventional circuit has been disclosed in Japanese Utility Model Application Laid-Open No. 61-15816. This conventional circuit is provided with a phase and frequency comparator, which outputs two signals to two detectors through two low-pass filters and then two high-pass filters. respectively. The frequency can be changed by changing a time constant of at least one of the high-pass filters.

The above prior arts for performing automatic frequency control by integrating (averaging) an f/V-converted output signal have the disadvantages described below.

To properly operate the integrator or the averaging circuit, received data must uniformly alternate the signal peaks shown in FIG. 1A as 1's and 0's. When receiving a signal with alternating 1 and 0 non-uniformly as shown in FIG. 1B such as "101011110 . . . ", the integrator or the averaging circuit outputs an erroneous control voltage as shown by the broken line DL in FIG. 1B, resulting in an non accurate local-oscillation frequency. Therefore, it is necessary to operate the automatic frequency control circuit when receiving a uniformly 1 and 0 alternating signal as shown in FIG. 1A.

Moreover, the integrator or the averaging circuit requires an integration or averaging time longer than the data rate. Particularly, a sync signal tends to be short due to recent increase of data transmission rates. Therefore, the conventional automatic frequency control circuit using the integrator or the averaging circuit has a problem that it is difficult to accurately set a local-oscillation frequency for one-time AFC operation.

SUMMARY OF THE INVENTION

An object of the present invention is to provide an AFC circuit and method, which can operate with shortened convergence time and accurately set a local-oscillation frequency for a center frequency regardless of whether a received signal does not uniformly alternate 1 and 0.

According to the present invention, an AFC circuit controls an oscillation frequency of a local oscillator provided in an FSK signal receiver. The AFC circuit includes a converter for converting a frequency of an FSK signal to a received signal voltage varying depending on the frequency of the FSK signal; a window generator for generating a voltage window including a reference voltage corresponding to a center frequency of the FSK signal; and a controller for controlling the oscillation frequency of the local oscillator depending on a deviation of the received signal voltage from the voltage window so that the received signal voltage falls into the voltage window.

The window generator may generate an upper-limit voltage and a lower-limit voltage, which define the voltage window having the reference voltage at a center thereof. The upper-limit voltage corresponds to a positive frequency shift and the lower-limit voltage corresponds to a negative frequency shift with respect to the center frequency of the FSK signal.

The window generator may generate a first upper-limit voltage, a second upper-limit voltage higher than the first upper-limit voltage, a first lower-limit voltage and a second lower-limit voltage lower than the first lower-limit voltage. The first upper-limit voltage and the first lower-limit voltage define the voltage window having the reference voltage at a center thereof. The first and second upper-limit voltages correspond to a positive frequency shift and the first and second lower-limit voltages correspond to a negative frequency shift with respect to the center frequency of the FSK signal.

BRIEF DESCRIPTION OF THE DRAWINGS

FIG. 1A is a diagram showing the relation between a received signal and a control voltage generated by a conventional AFC circuit when receiving an ideal FSK signal with alternating 1 and 0 uniformly;

FIG. 1B is a diagram showing the relation between a received signal and a control voltage generated by the conventional AFC circuit when receiving an FSK signal with alternating 1 and 0 non-uniformly;

DESCRIPTION OF THE PREFERRED EMBODIMENTS

Figure 4:
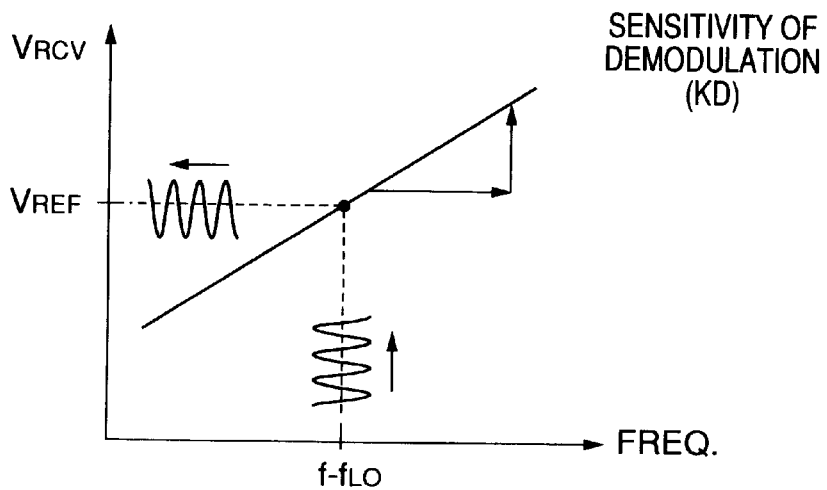
FIG. 4 is a graph showing a frequency-voltage characteristic of the f/V converter of the superheterodyne FSK receiver according to the first embodiment.

Embodiments of an automatic frequency control circuit according to the present invention are described below by referring to the accompanying drawings. The automatic frequency control circuit is effective for a reception system, which demodulates an FSK signal by using the f/V conversion characteristic as shown in FIG. 4.

SUPERHETERODYNE RECEIVER

Figure 2:
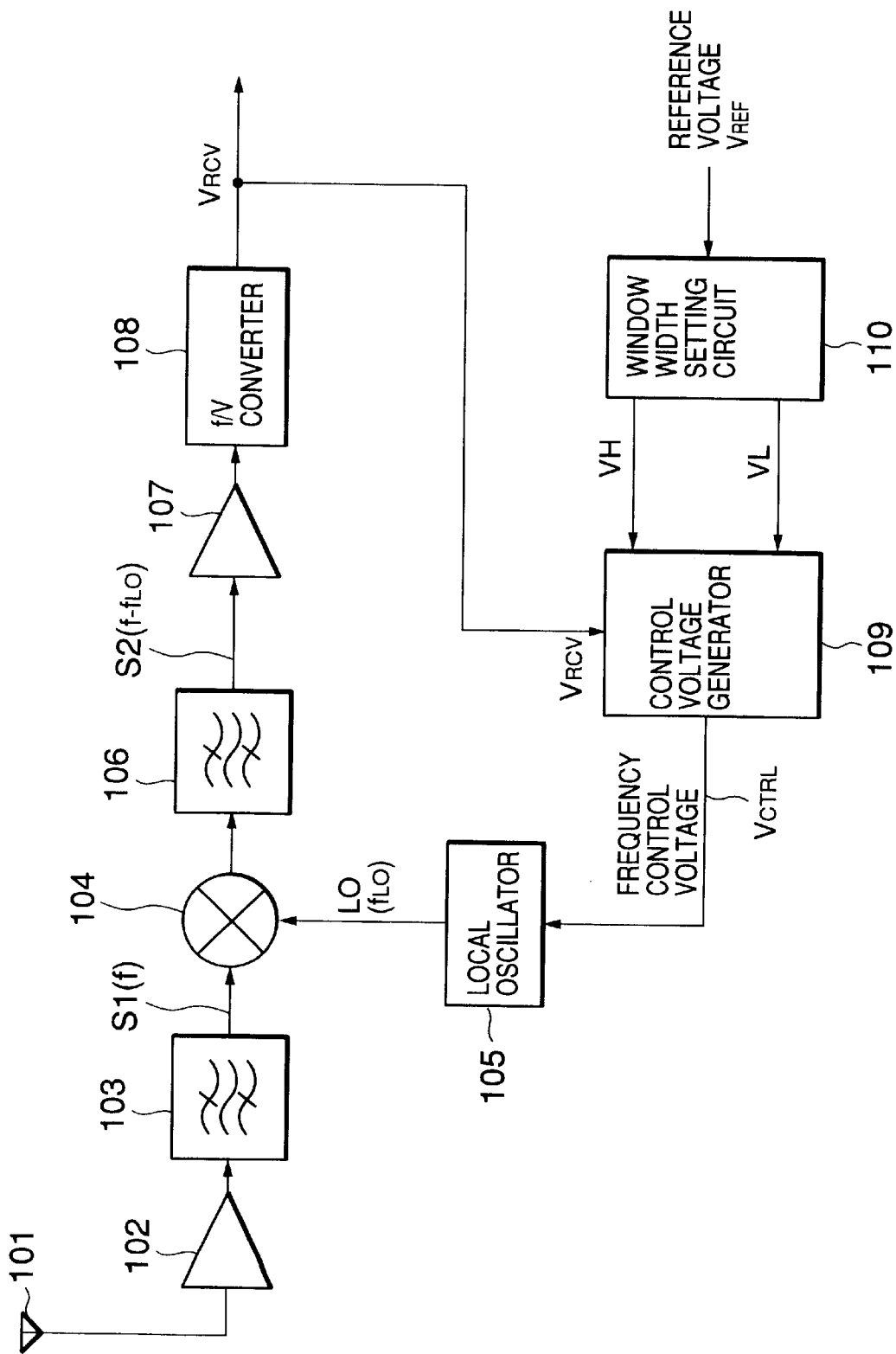
FIG. 2 is a block diagram showing the circuit of a superheterodyne FSK receiver employing an automatic frequency control circuit according to a first embodiment of the present invention.

Referring to FIG. 2, a radio-frequency FSK signal transmitted from a transmitter (not illustrated) is received by an antenna 101 and amplified by a high-frequency amplifier 102 and then, input to a mixer 104 via a band-pass filter 103. The mixer 104 mixes the radio-frequency FSK signal S1 output from the band-pass filter 103 with the local-oscillation signal LO output from a local oscillator 105 to convert it from the radio frequency into an intermediate frequency $(f-f_{LO})$.

Although an image frequency $(f+f_{LO})$ is also output in the case of the above frequency conversion, the image frequency component $(f+f_{LO})$ is removed by a band-pass filter 106. Then, only a second FSK signal S2 of the intermediate frequency $(f-f_{LO})$ passes through the band-pass filter 106 to input to a limiter amplifier 107, by which the second FSK signal S2 is amplitude-limited. The amplitude-limited output signal of the limiter amplifier 107 is input to an f/V converter 108. The f/V converter 108 converts the frequency of the output signal of the limiter amplifier 107 into a received signal voltage $V_{RCV}$ corresponding to that frequency. In this manner, the second FSK signal S2 is demodulated into a baseband signal varying in voltage depending on the frequency of the limiter amplifier 107.

The received signal voltage $V_{RCV}$ is also transferred to a control voltage generator 109 which outputs a frequency control voltage $V_{CTRL}$ to the local oscillator 105 using an upper-limit voltage VH and a lower-limit voltage VL received from a window-width setting circuit 110.

The window-width setting circuit 110 generates the upper-limit voltage VH and the lower-limit voltage VL from a reference voltage $V_{REF}$ which is a voltage corresponding to the center frequency of the second FSK signal S2.

Figure 3A:
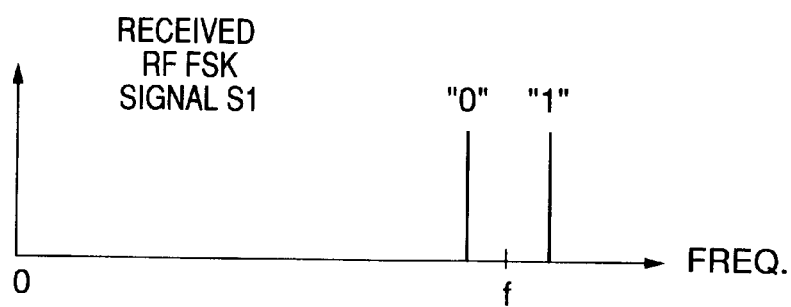
FIG. 3A is a diagram showing a frequency spectrum of a radio-frequency FSK signal input to a frequency converter of the superheterodyne FSK receiver according to the first embodiment.
Figure 3B:
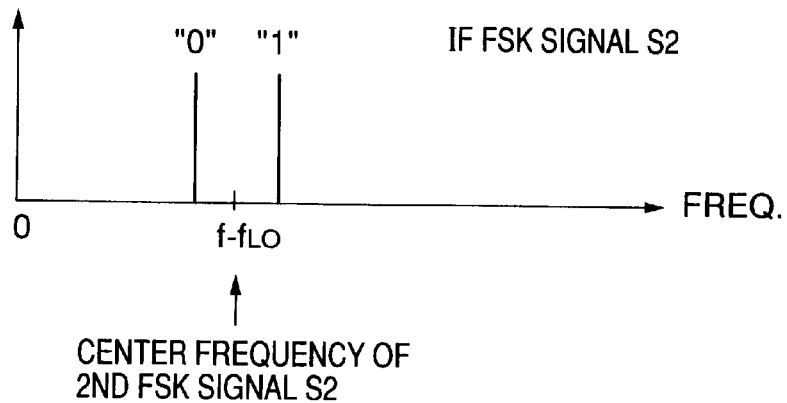
FIG. 3B is a diagram showing a frequency spectrum of an intermediate-frequency FSK signal output from the frequency converter of the superheterodyne FSK receiver according to the first embodiment.

As shown in FIGS. 3A and 3B, the radio-frequency FSK signal S1 has a center carrier frequency at f and has two frequency components corresponding to "1" and "0", respectively. Similarly, the second FSK signal S2 has a center intermediate-frequency frequency at $(f-f_{LO})$ and has two frequency components corresponding to "1" and "0", respectively. As described later, the center frequency $(f-f_{LO})$ is adjusted to the proper center frequency of the second FSK signal S2.

Referring to FIG. 4, the f/V converter 108 has a frequency-to-voltage conversion characteristic such that the output voltage $V_{RCV}$ increase as the frequency of the second FSK signal S2 increases and decreases as it decreases at the center voltage of $V_{REF}$ corresponding to the center frequency of $(f-f_{LO})$. Therefore, the f/V converter 108 can be used to demodulate the second FSK signal S2 to produce a baseband signal $V_{RCV}$. The rate of change in voltage with respect to frequency is defined as the sensitivity of demodulation (KD).

According to the received signal voltage $V_{RCV}$, the control voltage generator 109 outputs a frequency control voltage $V_{CTRL}$ to the local oscillator 105 by comparing it with both the upper-limit voltage VH and the lower-limit voltage VL received from the window-width setting circuit 110, as will be described later.

Figure 5:
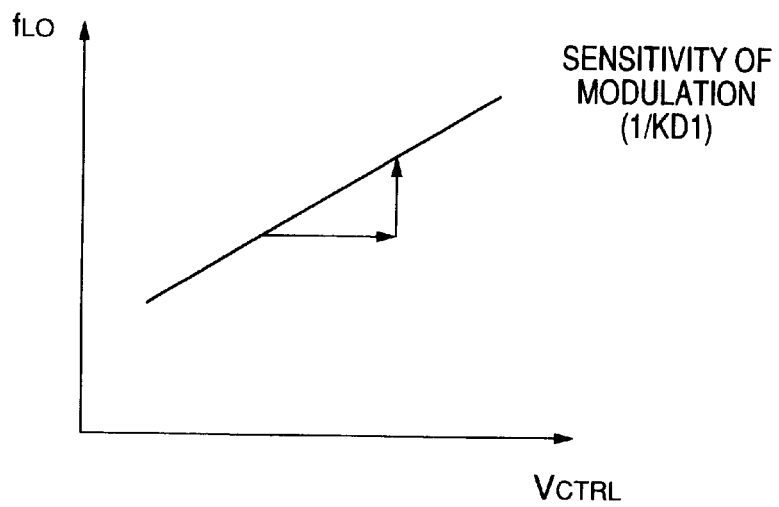
FIG. 5 is a graph showing a characteristic of a local oscillation frequency with respect to an input control voltage in a local oscillator of the superheterodyne FSK receiver according to the first embodiment.

Referring to FIG. 5, the local oscillator 105 varies its oscillation frequency $f_{LO}$ depending on the frequency control voltage $V_{CTRL}$. The rate of change in oscillation frequency $f_{LO}$ with respect to control voltage $V_{CTRL}$ is defined as the sensitivity of modulation (1/KD1).

The descriptions of the control voltage generator 109 and the window-width setting circuit 110 will be made in detail hereinafter.

FIRST EMBODIMENT

Figure 6:
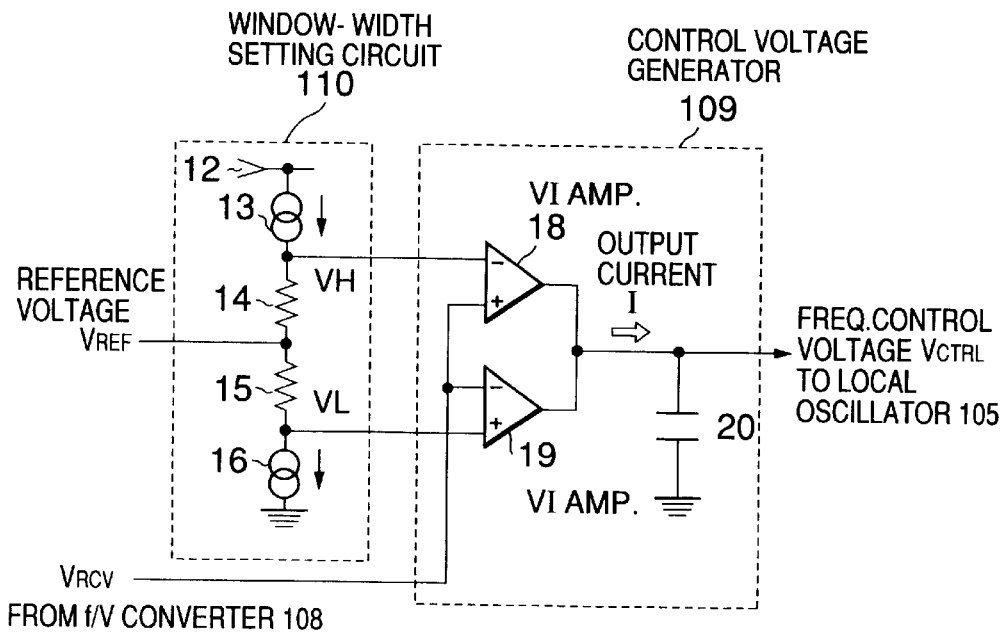
FIG. 6 is a circuit diagram showing a window-width setting circuit and a control voltage generator of the automatic frequency control circuit according to the first embodiment.

Referring to FIG. 6, the window-width setting circuit 110 is composed of a constant-current source 13, a resistor 14, a resistor 15, and a constant-current course 16 which are connected in series between a power supply line 12 and a GND (ground) line to generate a window defined by the upper-limit voltage VH and the lower-limit voltage VL.

The reference voltage $V_{REF}$ is applied to the connection point between the resistors 14 and 15. The upper-limit voltage VH of the window is generated at the connection point between the resistor 14 and the constant-current source 13 and the lower-limit voltage VL of the window is generated at the connection point between the resistor 15 and the constant-current source 16.

The connection point between the resistor 14 and the constant-current source 13 is connected to the inversion input terminal of a VI amplifier 18, which is an amplifier for inputting a voltage and outputting a current, of the control voltage generator 109. Moreover, the connection point between the resistor 15 and the constant-current source 16 is connected to the non-inversion input terminal of the VI amplifier 19.

The control voltage generator 109 is constituted with the VI amplifiers 18 and 19 and a capacitor 20. The non-inversion input terminal of the VI amplifier 18 and the inversion input terminal of the VI amplifier 19 are connected in common to the output terminal of the f/V converter 108 so that the output voltage $V_{RCV}$ of the f/V converter 108 is applied to them.

The output terminals of the VI amplifiers 18 and 19 are connected to the GND line through the capacitor 20 so that a control voltage $V_{CTRL}$ is output to the local oscillator 105 from the connection point between the capacitor 20 and the output terminals of the VI amplifiers 18 and 19.

Figure 7:
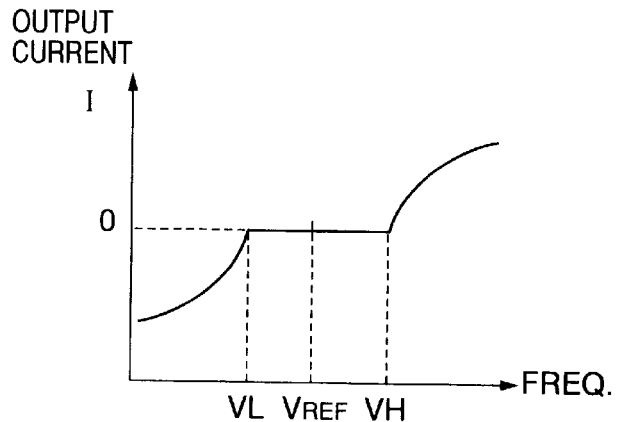
FIG. 7 is a diagram showing a $V_{RCV}$-I characteristic of the control voltage generator of the automatic frequency control circuit according to the first embodiment.

As shown in FIG. 7, the output current I flowing through the connection point of the output terminals of the VI amplifiers 18 and 19 varies depending on the output voltage $V_{RCV}$ of the f/V converter 108. In the case where the output voltage $V_{RCV}$ of the f/V converter 108 is kept between the upper-limit voltage VH and the lower-limit voltage VL, it is shown that the output current I is 0. When the output voltage $V_{RCV}$ exceeds the upper-limit voltage VH, the output current I starts flowing in a positive direction. When the output voltage $V_{RCV}$ is lowered below the lower-limit voltage VL, the output current I starts flowing in a negative direction.

Then, operations of the FSK receiver shown in FIG. 2 and the first embodiment shown in FIG. 6 will be described referring to FIG. 8.

A radio-frequency FSK signal is received by the antenna 101, amplified by the high-frequency amplifier 102, and input to the mixer 104 through the band-pass filter 103. The mixer 104 mixes the output signal S1 of the band-pass filter 103 with the local-oscillation signal LO of the local oscillator 105. The frequency-converted FSK signal is passed through the band-pass filter 106 to produce the second FSK signal S2 having an intermediate frequency of $(f-f_{LO})$.

After the output signal $(f-f_{LO})$ of the band-pass filter 106 is input to the limiter amplifier 107 where it is limited for amplitude, an output signal of the limiter amplifier 107 is input to the f/V convertor 108.

The output voltage $V_{RCV}$ of the f/V converter 108 is input to the control voltage generator 109. The window width shown in FIG. 8 set by the window-width setting circuit 110, that is, the upper-limit voltage VH and lower-limit voltage VL are applied to the control voltage generator 109.

In the case of the window of FIG. 6, the reference voltage $V_{REF}$ is applied to the connection point between the resistors 14 and 15 and a constant current flows through the resistors 14 and 15 by the constant-current sources 13 and 16. Therefore, the upper-limit voltage VH is always generated at the connection point between the constant-current source 13 and the resistor 14 and the lower-limit voltage VL is always generated at the connection point between the constant-current source 16 and the resistor 15.

The window is formed between the upper-limit voltage VH and the lower-limit voltage VL thus set and the upper-limit voltage VH an the lower-limit voltage VL are applied to the control voltage generator 109. The output voltage $V_{RCV}$ of the f/V converter 108 is also applied to the control voltage generator 109.

Figure 8:
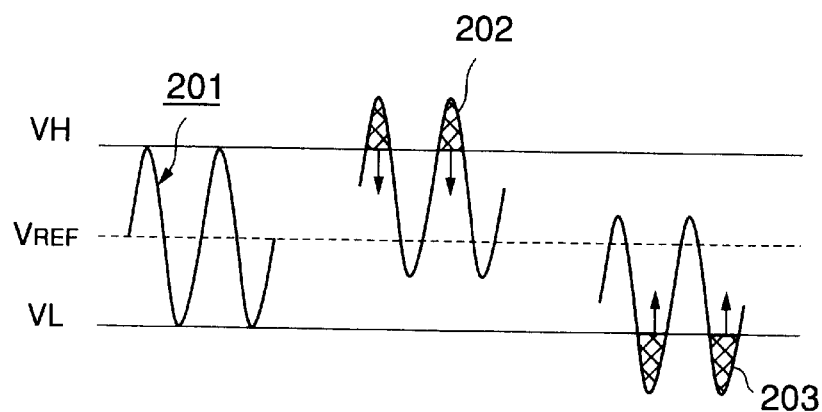
FIG. 8 is a diagram showing an operation of the automatic frequency control circuit according to the first embodiment.

When the output voltage $V_{RCV}$ of the f/V converter 108 is present within the window as shown by reference numeral 201 of FIG. 8, it is matched with the center frequency of the second FSK signal S2 as shown in FIG. 3B. Therefore, under the this state, the control voltage generator 109 does not operate because electric charges of the capacitor 20 do not move, or the output voltage of the control voltage generator 109 does not change. Therefore, the local-oscillation frequency of the local oscillator 105 does not change.

The upper-limit voltage VH and lower-limit voltage VL of the window set by the window-width setting circuit 110 are voltages corresponding to positive/negative frequency shift at the center voltage of the reference voltage $V_{REF}$ as shown in FIG. 8. For example, when assuming a frequency deviation as ±4.8 kHz, the voltage corresponding to the frequency deviation +4.8 kHz becomes equal to VH ad the voltage corresponding to the frequency deviation −4.8 kHz becomes equal to FL.

The output voltage $V_{RCV}$ of the f/V converter 108 is applied to the non-inversion input terminal of the VI amplifier 18 of the control voltage generator 109 and the inversion input terminal of the VI amplifier 19. Then, when the output voltage $V_{RCV}$ is higher than the upper-limit voltage VH as shown by reference numeral 202 in FIG. 8, it means that the output signal (f−$f_{LO}$) of the band-pass filter 106 is larger than the center frequency of the second FSK signal S2. Therefore, the output current I flows to the capacitor 20 from the output terminal of the VI amplifier 18 as shown in FIG. 7. Therefore, the capacitor 20 is charged by the output current I of the VI amplifier 18 to raise the control voltage $V_{CTRL}$ and thereby the local-oscillation frequency $f_{LO}$ of the local oscillator 105 is increased.

In this manner, the output signal having the intermediate frequency at (f−$f_{LO}$) of the band-pass filter 106 is adjusted to the proper center frequency of the second FSK signal S2 as shown in FIG. 3B. As a result, the output voltage $V_{RCV}$ of the f/V converter 108 lowers up to the upper-limit voltage VH or less and results in the proper state shown by the reference numeral 201 of FIG. 8.

On the contrary to the above, in the case where the output voltage $V_{RCV}$ of the f/V converter 108 is lower than the lower-limit voltage VL of the window as shown by a reference numeral 203 of FIG. 8, it means that the output signal (f−$f_{LO}$) of the band-pass filter 106 is smaller than the center frequency of the second FSK signal S2. In this case, the VI amplifier 19 discharges the electric charges of the capacitor 20 as shown in FIG. 7 to lower the potential and lowers the local-oscillation frequency $f_{LO}$ of the local oscillator 105.

As a result, the output voltage $V_{RCV}$ of the f/V converter 108 is raised up to the lower-limit voltage VL or higher and results in the state shown by the reference numeral 201 in FIG. 8. Therefore, the output voltage $V_{RCV}$ of the f/V convertor 108 is led into the window between the upper-limit voltage VH and lower-limit voltage VL. Thereby, the output signal (f−$f_{LO}$) of the band-pass filter 106 is matched with the center frequency of the second FSK signal as shown in FIG. 3B.

As described above, even if the output voltage $V_{RCV}$ of the f/V converter 108 exceeds the upper-limit voltage VH or lower-limit voltage VL of the window width, the local-oscillation frequency $f_{LO}$ of the local oscillator 105 is controlled by the control voltage generator 109 so as to cover the amplitude-varying range of the voltage $V_{RCV}$ of the f/V converter 108 with the window.

Hereinafter, there will be described the convergence time of the local-oscillation frequency $f_{LO}$ of the local oscillator 105, taking the case shown by the reference numeral 202 of FIG. 8 as an example.

As described before, in the conventional automatic frequency control using the averaging or integration (see FIG. 18B), the time long enough for the data rage of received data is required to average output voltages of the f/V converter 108. Contrarily, in the case of the first embodiment, the automatic frequency control is performed without averaging output voltages of the f/V converter 108 (see FIG. 18A). Therefore, the convergence time is short compared to the case of the prior art.

Figure 18A:
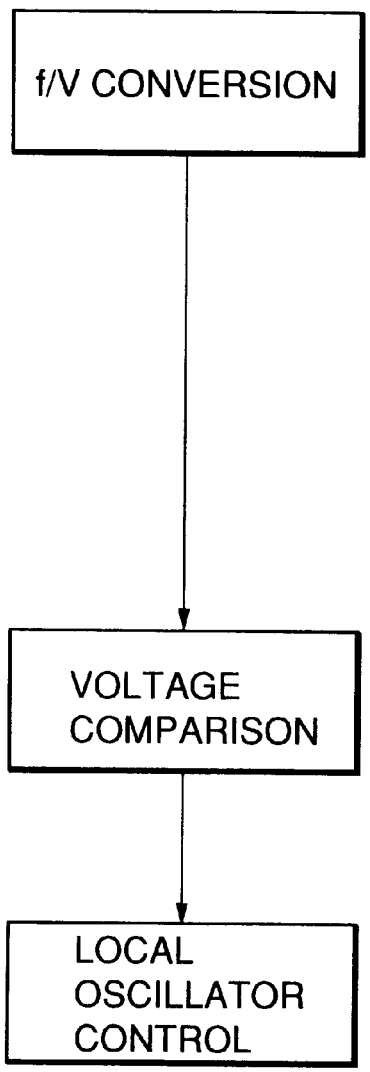
FIG. 18A is a flow chart showing a schematic operation flow of the automatic frequency control circuit according to the present invention.
Figure 18B:
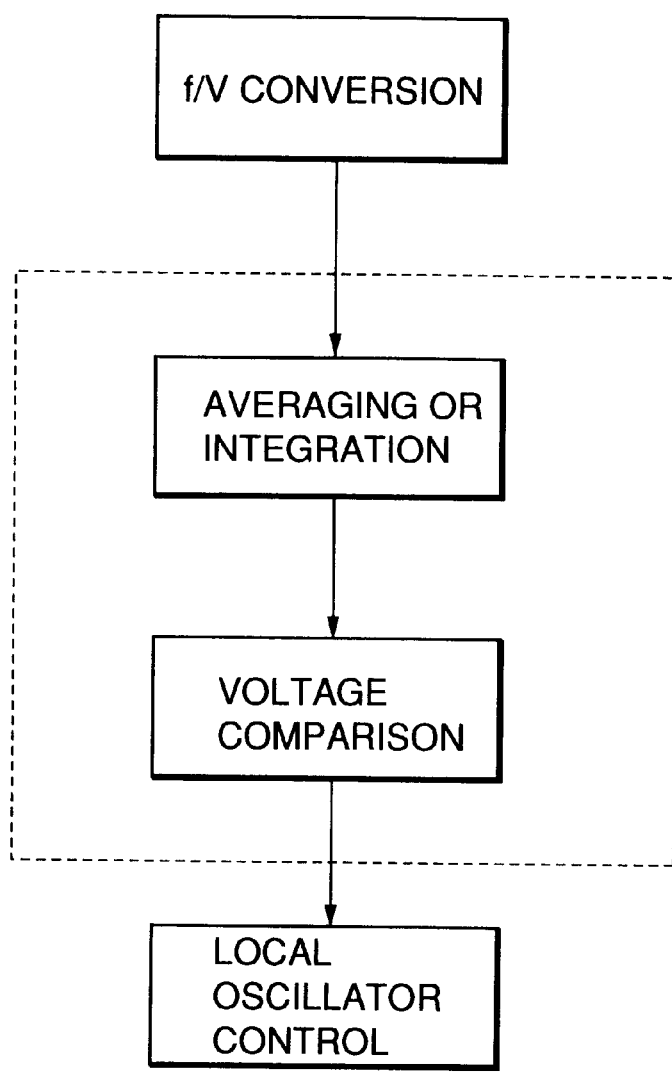
FIG. 18B is a flow chart showing a schematic operation flow of the conventional automatic frequency control circuit.

More specifically, the output voltage $V_{RCV}$ of the f/V converter 108 is input to the control voltage generator 109 and then is compared with the upper-limit voltage VH an the lower-limit voltage VL of the window. As shown in FIG. 8, the output voltage $V_{RCV}$ of the f/V converter 108 is equal to or higher than the upper-limit voltage VH an therefore the local-oscillation frequency $f_{LO}$ of the local oscillator 105 is controlled so that the output voltage $V_{RCV}$ falls into the window. Therefore, the processing procedure shown in FIG. 18A is shortened compared to that shown in FIG. 18B and the convergence time of the local oscillator 105 is shortened.

The convergence time of the local-oscillation frequency $f_{LO}$ of the local oscillator 105 is further described below. As described above, the local-oscillation frequency $f_{LO}$ of the local oscillator 105 is controlled by the voltage between terminals of the capacitor 20 of the control voltage generator 109 and the output voltage of the control voltage generator 109 can be expressed as shown below.

When assuming the amount of electric charge in the capacitor 20 as Q, the capacitance of the capacitor 20 as C, an the voltage across the capacitor 20 as V, the following expressions (1) and (2) are obtained:

$$Q = CV \tag{1}$$

and $$dQ/dt = c \cdot dV/dt \tag{2}$$

Therefore, to perform frequency pull-in with one symbol, it is necessary to set the capacitor 20 and the output current I of the control voltage generator 109 so that the following expressions (3) to (5) are satisfied, assuming the area (hatched portion of reference numeral 202 in FIG. 8) of the output voltage $V_{RCV}$ of the f/V converter 108 as S when it exceeds the upper-limit voltage VH, the frequency of the output voltage $V_{RCV}$ as $f_{f/V}$, the demodulation sensitivity of the f/V converter 108 as KD (=voltage variation/frequency variation), and the modulation sensitivity of the local oscillator 105 with respect to the voltage across the capacitor 20 as 1/KD1 that is obtained by dividing the frequency variation of local oscillator 105 by the voltage variation of control voltage generator 109.

$$\text{Area } S \leq 1/(2\,f_{f/v}) \cdot dv/dt \cdot KD/KD1 \tag{3}$$

$$\leq 1/(2\,f_{f/v}) \cdot 1/C \cdot dQ/dt \cdot KD/KD1 \tag{4}$$

In this case, by assuming that the output current I is constant for simplification, the following expression (5) is obtained:

$$\text{Area } S \leq 1/(2\,f_{f/v}) \cdot 1/C \cdot I \cdot KD/KD1 \tag{5}$$

The area S is determined by the maximum frequency shift which should be pulled in for one symbol.

Similarly, by computing the case of the reference numeral 203 in FIG. 8, the above expression (5) is obtained. Therefore, by determining the capacitor 20 and the output current I of the control voltage generator 109 so as to meet the expression (5), it is possible to pull in the local-oscillation frequency $f_{LO}$ of the local oscillator 105 with one symbol.

An example of the circuit of the control voltage generator 109 will be described hereinafter.

Figure 11:
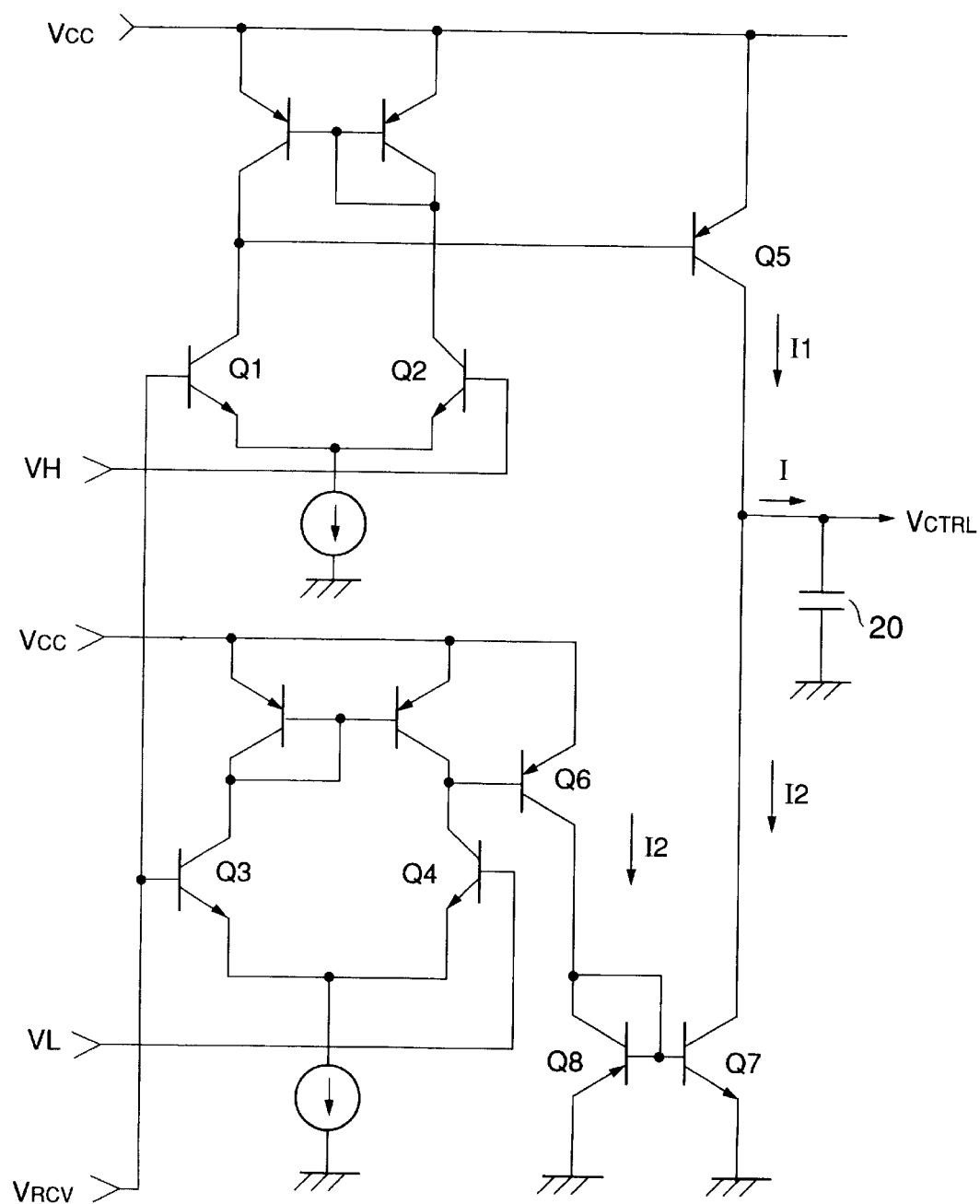
FIG. 11 is a detailed circuit diagram showing an example of the window-width setting circuit and the control voltage generator of FIG. 6.

Referring to FIG. 11, the amplifier 18 is comprised of a differential pair of transistors Q1 and Q2 and a current-mirror circuit. The base of the transistor Q1 inputs the voltage $V_{RCV}$ from the f/V converter 108 an the base of the transistor Q2 inputs the upper-limit voltage VH from the window-width setting circuit 110. The amplifier 19 is comprised of a differential pair of transistors Q3 and Q4 and a current-mirror circuit. The base of the transistor Q3 inputs the voltage $V_{RCV}$ from the f/V converter 108 and the base of the transistor Q4 inputs the lower-limit voltage VL from the window-width setting circuit 110.

The collector of the transistor Q1 is connected to the base of the transistor Q5 and the collector of the transistor Q4 is connected to the base of a transistor Q6. The emitters of the transistors Q5 and Q6 are connected to the power supply line. The collector of the transistor Q5 is connected to the collector of a transistor Q7 and further to the capacitor 20. The collector of the transistor Q6 is connected to the collector of a transistor Q8 which forms a current-mirror circuit with the transistor Q7.

In the case where a current $I_1$ flows through the transistor Q5 and a current $I_2$ flows through the transistor Q7, the currents $I_1$ and $I_2$ each vary depending on whether the voltage $V_{RCV}$ falls into the window defined by the upper-limit voltage VH and the lower-limit voltage VL. Since the output current I is determined by $I_1-I_2$, the output current I varies depending on whether the voltage $V_{RCV}$ falls into the window as shown in FIG. 7.

SECOND EMBODIMENT

Figure 9:
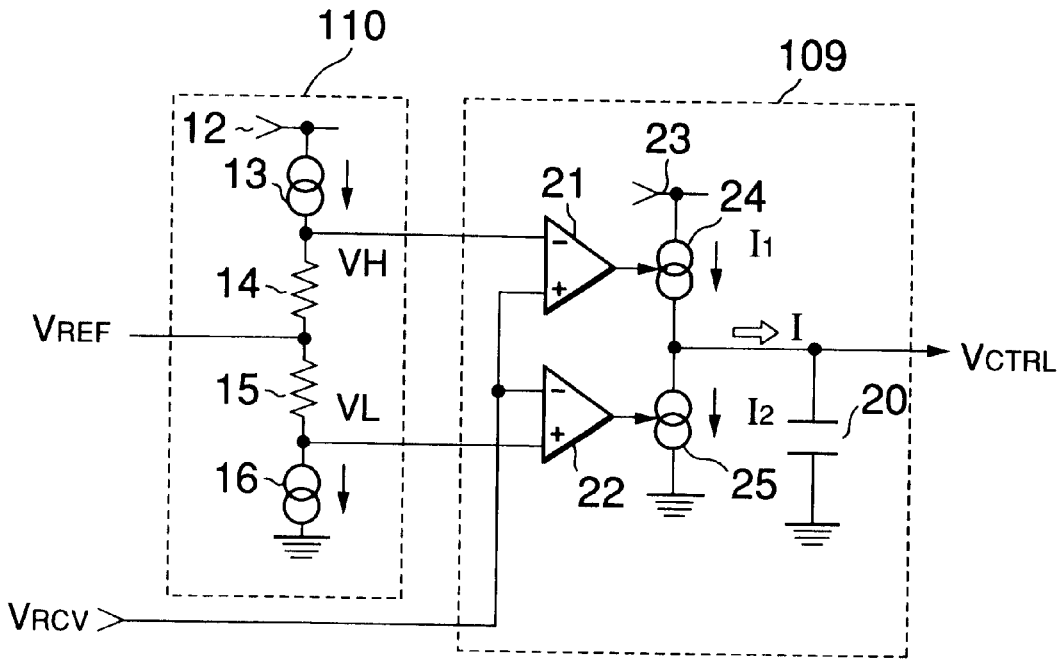
FIG. 9 is a circuit diagram showing a window-width setting circuit and a control voltage generator of the automatic frequency control circuit according to a second embodiment of the present invention.

Then, the second embodiment of the present invention is described below by referring to the accompanying drawings. FIG. 9 is a circuit diagram showing the structure of the second embodiment.

Referring to FIG. 9, the structure of the window-width setting circuit 110 is the same as that in FIG. 6. Although the description of the window-width setting circuit 110 is omitted, the structure of the control voltage generator 109 is different from that in FIG. 6. That is, in the case of the control voltage generator 109 in FIG. 9, constant-current sources 24 and 25 are newly added and comparators 21 and 22 are used instead of the VI amplifiers 18 and 19.

The inverting input terminal of the comparator 21 is connected to the connection point between the constant-current source 13 and the resistor 14 of the window-width setting circuit 110. The non-inverting input terminal of the comparator 22 is connected to the connection point between the resistor 15 and the constant-current source 16 of the window-width-setting circuit 110. The output voltage $V_{RCV}$ of the f/V converter 108 shown in FIG. 2 is applied to the non-inverting input terminal of the comparator 21 and the inverting input terminal of the comparator 22.

The output terminal of the comparator 21 is connected to the constant-current source 24 and that of the comparator 22 is connected to the constant-current source 25. The constant-current sources 24 and 25 are connected in series between a power supply line 23 and a GND line.

The connection point between the constant-current sources 24 and 25 is connected to the GND through a capacitor 20 and moreover connected to the local oscillator 105. Other structures are the same as those in FIG. 6.

According to the above structure, the window-width setting circuit 110 outputs the upper-limit voltage VH and the lower-limit voltage VL corresponding to the positive/negative frequency shift to the voltage corresponding to the center frequency of the second FSK signal shown in FIG. 3B, which are generated similarly to the case of FIG. 6.

The voltage $V_{RCV}$ supplied from the f/V converter 108 is applied to the non-inverting input terminal of the comparator 21 and the inverting input terminal of the comparator 22. When the voltage $V_{RCV}$ is higher than the upper-limit voltage VH, the output of the comparator 21 becomes high-level (hereafter referred to as "H") to turn on the constant-current source 24. Moreover, the output of the comparator 22 becomes "L" to turn off the constant-current source 25 with the output of the comparator 22. Thereby, an output current I flows to the capacitor 20 from the constant-current source 24, the capacitor 20 is charged to raise the output voltage $V_{CTRL}$ of the control voltage generator 109 and the local-oscillation frequency $f_{LO}$ of the local oscillator 105. As a result, the frequency of the output signal (f-$f_{LO}$) of the band-pass filter 106 is adjusted to the proper center frequency of the second FSK signal S2.

Moreover, on the contrary to the above mentioned, when the output voltage $V_{RCV}$ of the f/V converter 108 lowers to the lower-limit voltage VL or lower, the output of the comparator 22 becomes "H" and thereby, the constant-current source 25 is turned on, and the output of the comparator 21 becomes low-level (hereafter referred to as "L") to turn off the constant-current source 24. As a result, electric charges of the capacitor 20 flow toward the constant-current source 25 to lower the voltage across the capacitor 20 and in its turn, lower the output voltage $V_{CTRL}$ of the control voltage generator 109. Thereby, the local-oscillation frequency $f_{LO}$ of the local oscillator 105 is lowered and the frequency of the output signal (f-$f_{LO}$) of the band-pass filter 106 is adjusted to the proper center frequency of the second FSK signal S2.

Operations of the second embodiment shown in FIG. 9 are basically the same as those of the first embodiment in FIG. 6.

Figure 10:
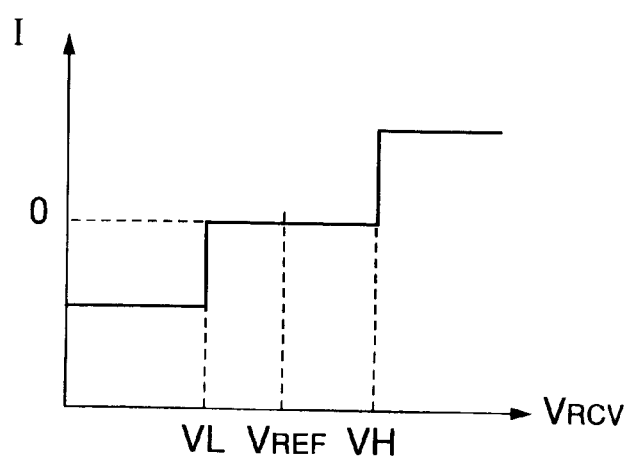
FIG. 10 is a diagram showing a $V_{RCV}$-I characteristic of the control voltage generator of the automatic frequency control circuit according to the second embodiment.

As shown in FIG. 10, however, the input-output characteristic for pulling the output voltage $V_{RCV}$ of the f/V converter 108 into the window is clearly different from that in FIG. 7. Therefore, the second embodiment is characterized by changing electric charges of the capacitor 20 with a predetermined constant current to change the output voltage $V_{CTRL}$ of the control voltage generator 109 when the output voltage of the f/V converter 108 deviates from the window.

THIRD EMBODIMENT

Figure 12:
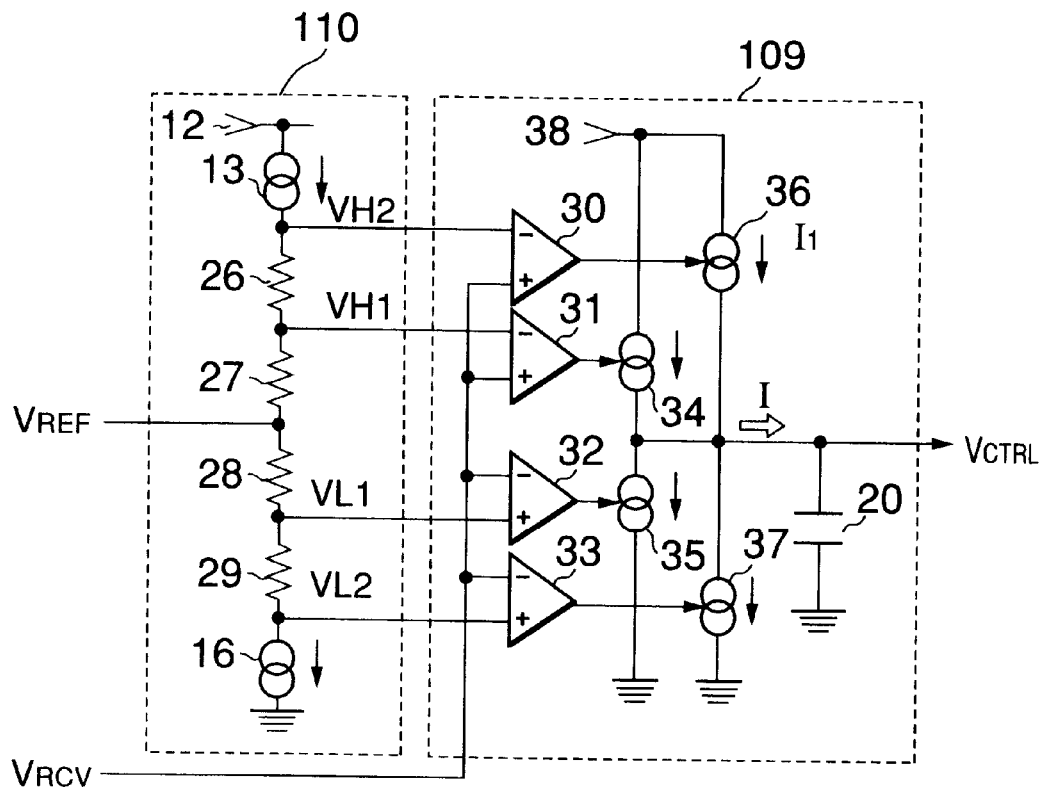
FIG. 12 is a circuit diagram showing a window-width setting circuit ad a control voltage generator of the automatic frequency control circuit according to a third embodiment of the present invention.

Referring to FIG. 12, the third embodiment is different from the second embodiment of FIG. 9 in that four reference voltages are output from the window-width setting circuit 110. That is, the window-width setting circuit 110 is constituted by a series circuit including a constant-current source 13, resistors 26 to 29, and a constant-current source 16 which are connected in series between the power supply line 12 and the GND line. The reference voltage $V_{REF}$ is applied to the connection point between the resistors 27 and 28.

Figure 13:
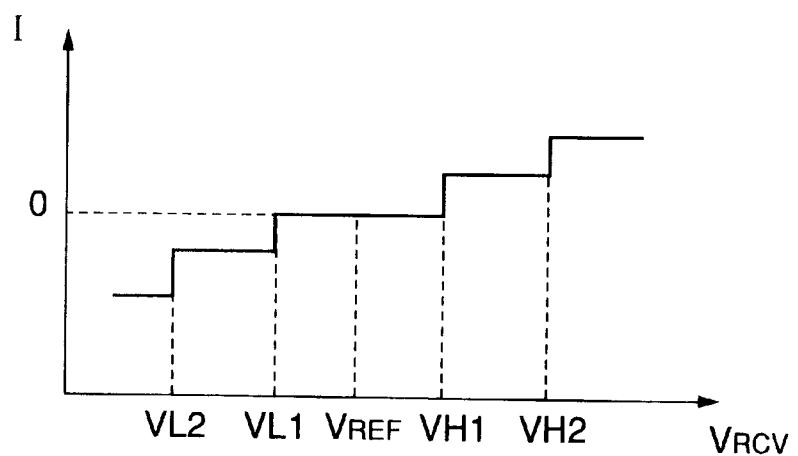
FIG. 13 is a diagram showing a $V_{RCV}$-I characteristic of the control voltage generator of the automatic frequency control circuit according to the third embodiment.

In the window-width setting circuit 110, a first upper-limit voltage VH1 is generated on the connection point between the resistors 26 and 27. A second upper-limit voltage VH2 (VH2>VH1) is generated on the connection point between the constant-current source 13 and the resistor 26 as shown in FIG. 13. A first lower-limit voltage VL1 is generated on the connection point between the resistors 28 and 29 and the second lower-limit voltage VL2 (VL2<VL1) is generated on the connection point between the resistor 29 and the constant-current source 16.

In the control voltage generator 109, four comparators 30 to 33 and four constant-current sources 34 to 37 are provided. The respective comparators 30–33 input the above four reference voltages VH2, VH1, VL1 and VL2. More specifically, the inverting input terminal of the comparator 30 is connected to the connection point between the constant-current source 13 and the resistor 26. The inverting input terminal of the comparator 31 is connected to the connection point between the resistors 26 and 27. The non-inverting input terminal of the comparator 32 is connected to the connection point between the resistors 28 and 29. And, the non-inverting input terminal of the comparator 33 is connected to the connection point between the resistor 29 and the constant-current source 16.

The output voltage $V_{RCV}$ of the f/V converter 108 is applied in common to the non-inverting input terminals of the comparators 30 and 31 and the inverting input terminals of the comparators 32 and 33.

Two constant-current sources 34 and 35 are connected in series between a power supply line 38 and the GND line. A constant-current source 36 is connected to the constant-current soruce 34 in parallel and a constant-current source 37 is connected to the constant-current source 35 in parallel. The constant-current source 36 is turned on/off by the output of the comparator 30 and the constant-current source 34 is turned on/off by the output of the comparator 31. The constant-current source 35 is turned on/off by the output of the comparator 32. Moreover, the constant-current source 37 is turned on/off by the output of the comparator 33.

The connection point between the constant-current sources 34 and 35 and the connection point between the constant-current sources 36 and 37 are connected to the GND line through the capacitor 20 and the control voltage $V_{CTRL}$ is applied to the local oscillator 105. Thus, the control voltage generator 109 is constituted with the comparators 30 to 33, the constant-current sources 34 to 37, and the capacitor 20.

Operations of the third embodiment are described below. The output voltage $V_{RCV}$ of the f/V converter 108 is applied to the non-inverting input terminals of the comparators 30 and 31 and the inverting input terminals of the comparators 32 and 33.

When the output voltage $V_{RCV}$ is higher than the first upper-limit voltage VH1, the output of the comparator 31 becomes "H" to turn on the constant-current source 34, outputs of other comparators 30, 32, and 33 become "L", and the constant-current sources 35 to 37 are turned off. Thereby, an output current I is supplied to the capacitor 20 from the constant-current source 34, the capacitor 20 is charged by the output current I to raise the voltage $V_{CTRL}$ of the control voltage generator 109 and the local-oscillation frequency $f_{LO}$ of the local oscillator 105, and adjust the output signal (f-$f_{LO}$) of the band-pass filter 106 to the proper center frequency of the second FSK signal S2.

When the output voltage $V_{RCV}$ of the f/V converter 108 is higher than the upper-limit voltage VH2, outputs of the comparators 30 and 31 become "H" and outputs of the comparators 32 and 33 become "L". The constant-current sources 36 and 34 are turned on and the constant-current sources 36 and 37 are turned off by the outputs of the comparators 30 and 31. When the constant-current sources 36 and 34 are turned on, a charge current larger than a synthetic current is supplied to the capacitor 20 from the constant-current sources 36 and 34. Therefore, the voltage of the capacitor 20, that is, the output voltage $V_{CTRL}$ of the control voltage generator 109 quickly rises and the local-oscillation frequency $F_{LO}$ of the local oscillator 105 is also further raised to adjust the frequency of the output signal (f-$f_{LO}$) of the band-pass filter 106 to the proper center frequency of the second FSK signal S2.

When the output voltage $V_{RCV}$ of the f//V converter 108 is lower than the first lower-limit voltage VL1 or second lower-limit voltage VL2, the comparator 32 or 33 becomes "H" to turn on the constant-current source 35 or 37 and discharge the electric charges of the capacitor 20. As a result, the output voltage $V_{CTRL}$ of the control voltage generator 109 lowers to lower the local-oscillation frequency $f_{LO}$ of the local oscillator 105. Therefore, the frequency of the output signal (f-$f_{LO}$) of the band-pass filter 106 is adjusted to the proper center frequency of the second FSK signal S2.

The basic operation of the embodiment in FIG. 12 is completely the same as that of the second embodiment shown in FIG. 9. However, the relation between the output voltage $V_{RCV}$ and output current I as shown in FIG. 13 is different from that in FIG. 10 as described above.

By using the structure of the third embodiment, it is possible to realize any pull-in characteristic for any local-oscillation frequency of the local oscillator 105. Since the four reference voltages, that is, the first and second upper-limit voltages VH1 and VH2 and the first and second lower-limit voltages VL1 and VL2 are used to generate a window having a plurality of steps.

FOURTH EMBODIMENT

Figure 14:
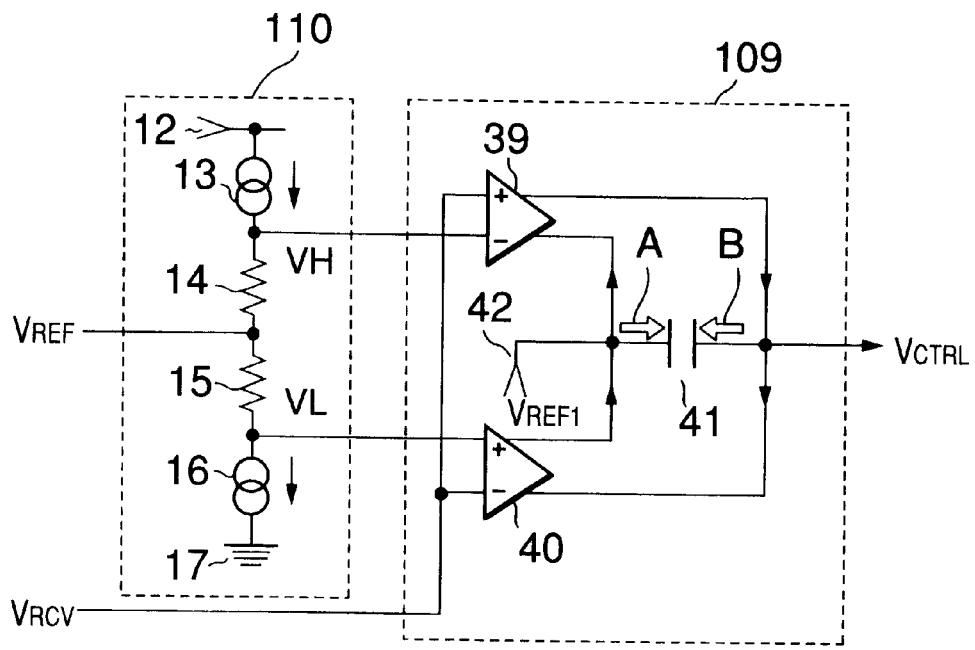
FIG. 14 is a circuit diagram showing a window-width setting circuit and a control voltage generator of the automatic frequency control circuit according to a four the embodiment of the present invention.

As shown in FIG. 14, the fourth embodiment is similar to the first embodiment as shown in FIG. 6. However, the fourth embodiment is different from the first embodiment in that differential-output VI amplifiers 39 and 40 are used for the control voltage generator 109 and a capacitor 20 is charged in two charging ways. Since the structure of the window-width-setting circuit 110 is the same as that in FIG. 6, the same portion is denoted by the same reference numerals and the descriptions thereof are omitted.

In the control voltage generator 109, the one output terminals of differential-output VI amplifiers 39 and 40 are connected to each other and the other output terminals of the amplifiers 39 and 40 are also connected to each other. A capacitor 41 is connected between the connection points of the one output terminals and the other output terminals. A reference voltage 42 is applied to one electrode of the capacitor 41 and the other electrode of the capacitor 41 is connected to the local oscillator 105.

Operations of the fourth embodiment are described below. The output voltage $V_{RCV}$ of the f/V converter 108 is applied to the non-inverting input terminal of the VI amplifier 39 and the inverting input terminal of the VI amplifier 40. When the output voltage $V_{RCV}$ is higher than the upper-limit voltage VH of a window, the differential-output VI amplifier 39 is turned on. This causes the capacitor 41 to be charged by a output current B of the VI amplifier 39 as shown in FIG. 14, and electric charges to be discharged from the other terminal of the capacitor 41 by a output current A of the VI amplifier 39.

Thus, the output voltage $V_{CTRL}$ of the control voltage generator 109 becomes higher than a reference voltage 42. As a result, similarly to the first embodiment of FIG. 6, the local-oscillation frequency $F_{LO}$ of the local oscillator 105 rises and the frequency of the output signal (f-$f_{LO}$) of the band-pass filter 106 is adjusted to the proper center frequency of the second FSK signal S2.

Contrarily, when the output voltage $V_{RCV}$ of the f/V converter 108 is lower than the lower-limit voltage VL of the window, the VI amplifier 40 is turned on. the capacitor 41 is discharged by the output current B of the VI amplifier 40, the other terminal of the capacitor 41 is charged by the output current A of the VI amplifier 40, and the output voltage $V_{CTRL}$ of the control voltage generator 109 becomes lower than the reference voltage 42. As a result, the local-oscillation frequency $f_{LO}$ of the local oscillator 105 lowers, and the output signal (f-$f_{LO}$) of the band-pass filter 106 is adjusted to the proper center frequency of the second FSK signal S2.

Figure 15:
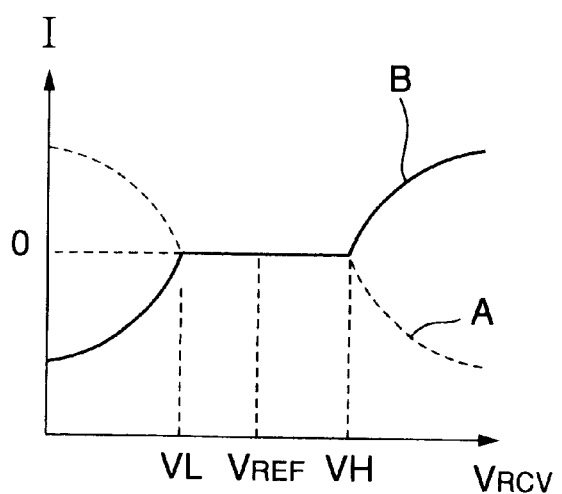
FIG. 15 is a diagram showing a $V_{RCV}$-I characteristic of the control voltage generator of the automatic frequency control circuit according to the four the embodiment.

The basic operation of the fourth embodiment is the same as that of the first embodiment in FIG. 6. However, the fourth embodiment is different from the first embodiment in that the curve of output current I with respect to the output voltage $V_{RCV}$ is symmetric about the line of I=0 as shown in FIG. 15.

Thus, since the capacitor 41 is charged by both the currents A and B, electric charges of the capacitor 41 are rapidly moved compared to the case of the first embodiment. Therefore, it is possible to correct the local-oscillation frequency $f_{LO}$ of the local oscillator 105 at high speeds.

Moreover, it is possible to use constant-current sources as described in the second embodiment of FIG. 9 in place of the differential-output amplifiers 39 and 40.

The above embodiments of FIGS. 6, 9, 12, and 14 are applied to the single-superheterodyne system. However, these can be also applied to the double-superheterodyne system.

DIRECT-CONVERSION RECEIVER

The present invention can be applied to a direct-conversion FSK receiver. Taking a direct-conversion FSK receiver employing WEAVER system as an example, the details will be described below.

Figure 16:
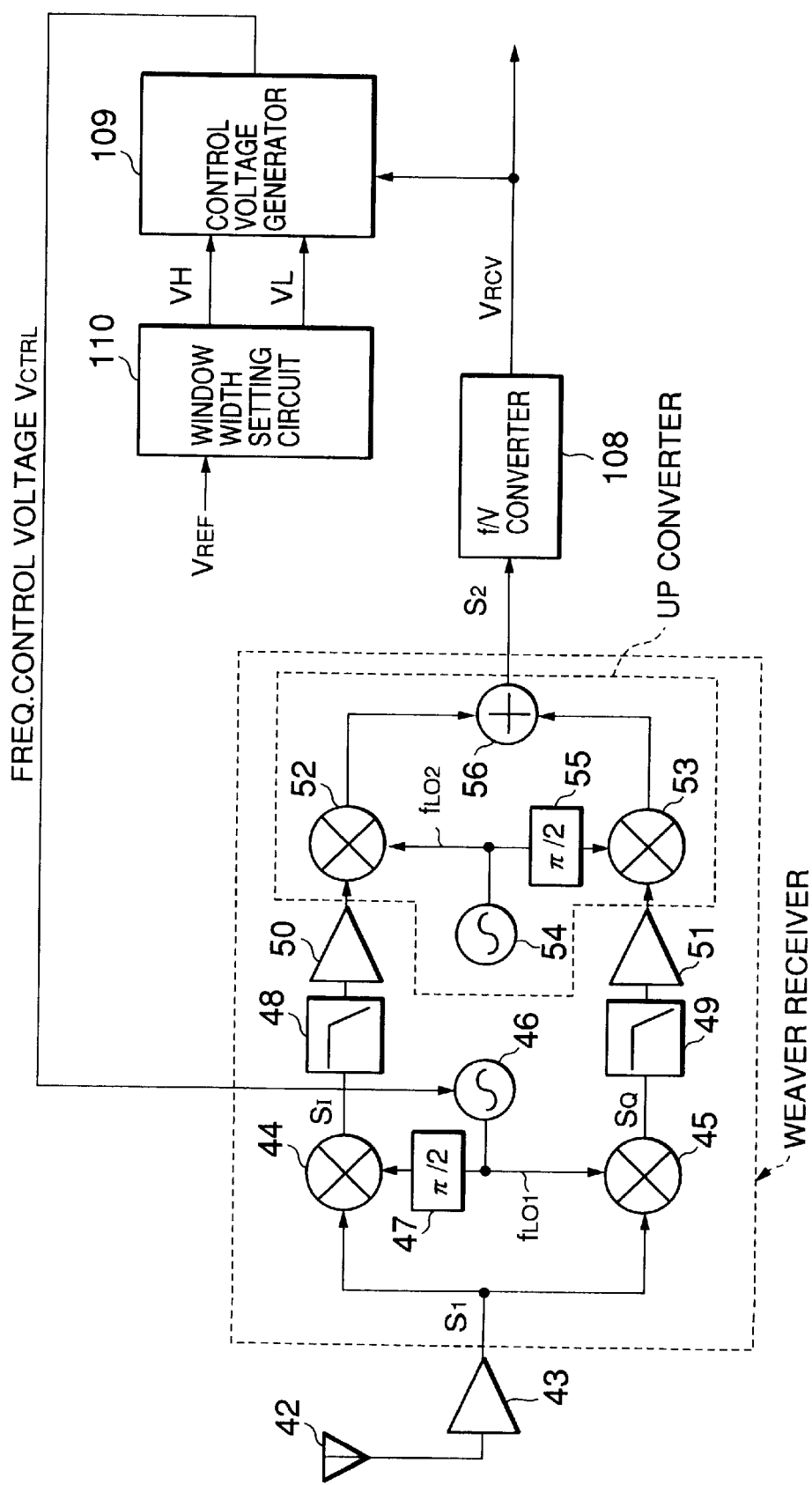
FIG. 16 is a block diagram showing the circuit of a direct-conversion FSK receiver employing an automatic frequency control circuit according to the first embodiment of the present invention.

Referring to FIG. 16, a WEAVER receiver outputs the second FSK signal S2 is converted into a voltage $V_{RCV}$ by the f/V converter 108 and this output voltage $V_{RCV}$ is applied to the control voltage generator 109. The f/V converter 108, the control voltage generator 109 and the window-width setting circuit 110 are the same as in FIG. 2.

In the WEAVER receiver, an FSK signal having a carrier frequency represented by $\cos(\omega \pm \Delta\omega)t$ (frequency shift of $\Delta\omega/2\pi$) is received by an antenna 42, amplified by a high-frequency amplifier 43, and then branched into two signals and input to mixers 44 and 45, respectively.

A local-oscillation signal having a frequency $f_{LO1}$ of $\sin \omega t$ generated by a first local oscillator 46 is input to the mixer 44 through a $\pi/2$ phase shifter 47 which delays it by 90° but the local-oscillation signal of $f_{LO1}$ is directly input to the mixer 45.

The mixer 44 mixes the radio-frequency FSK signal S1 with the local-oscillation signal delayed by 90° to produce a baseband I-component signal $S_I$ represented by $\cos(\omega \pm \Delta\omega)t \cdot \cos\omega t$. The baseband signal $S_I$ passing through a low-pass filter 48 is amplified by an amplifier 50 and then amplified signal represented by $k[\cos\Delta\omega t + \frac{1}{3} \cdot \cos(3\Delta\omega)t + \frac{1}{5} \cdot \cos(5\Delta\omega)t \pm \ldots]$ is output to a mixer 52 of the up-converter. The mixer 52 mixes it with a second local-oscillation signal having a frequency of $f_{LO2}$ represented by $\sin\omega_2 t$ generated by a second local oscillator 54 to frequency-converts it from baseband to intermediate frequency and outputs the up-converted signal to an adder 56.

On the other hand, a mixer 45 mixes the radio-frequency FSK signal S1 with the first local-oscillation signal generated by the first local oscillator 46 to produce a baseband Q-component signal $S_Q$ represented by $\cos(\omega \pm \Delta\omega)t \cdot \sin\omega t$. The baseband signal $S_Q$ passing through a low-pass filter 49 is amplified by an amplifier 51 and then the amplified signal represented by $k[\pm\sin(\Delta\omega)t \pm \frac{1}{3} \cdot \sin(3\Delta\omega)t \pm \frac{1}{5} \cdot \sin(5\Delta\omega)t \pm \ldots]$ is output to a mixer 53 of the up-converter. The mixer 53 mixes it with the 90°-delayed second local-oscillation signal $\cos\omega_2 t$ produced by a $\pi/2$ phase shifter 55 to frequency-converts it from baseband to intermediate frequency and outputs the up-converted signal to the adder 56.

The adder 56 produces the second FSK signal S2 represented by $k[\sin(\omega_2 \pm \Delta\omega)t \pm \frac{1}{3} \cdot \sin3(\omega_2 \pm \Delta\omega)t + \frac{1}{5}\sin5(\omega_2 \pm \Delta\omega)t + \ldots]$ and the second FSK signal S2 is input to the f/V converter 108.

As described before, the f/V converter 108 produces a voltage $V_{RCV}$ varying depending on the frequency of the second FSK signal S2. The voltage $V_{RCV}$ is compared with the upper-limit voltage VH and the lower-limit voltage VL to produce the frequency control voltage $v_{CTRL}$ by the control voltage generator 109. In the WEAVER receiver, the frequency control voltage $v_{CTRL}$ is applied to the first local oscillator 46 and the first local frequency $f_{LO1}$ is adjusted so that the varying voltage $V_{RCV}$ falls into the window defined by the upper-limit voltage VH and the lower-limit voltage VL as described before.

Figure 17A:
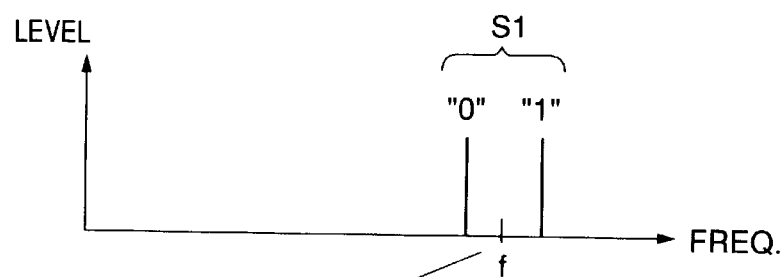
FIG. 17A is a diagram showing a frequency spectrum of a radio-frequency FSK signal input to mixers of the direct-conversion FSK receiver of FIG. 16.
Figure 17B:
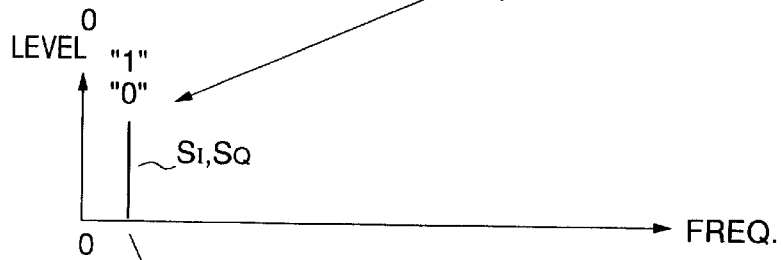
FIG. 17B is a diagram showing a frequency spectrum of baseband I and Q signals output from mixers of the direct-conversion FSK receiver of FIG. 16.
Figure 17C:
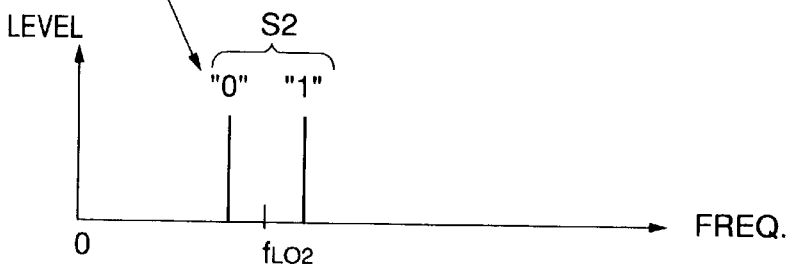
FIG. 17C is a diagram showing a frequency spectrum of an intermediate-frequency FSK signal output from the mixers of the direct-conversion FSK receiver of FIG. 16.

Referring to FIGS. 17A–17C, the radio-frequency FSK signal S1 has a center carrier frequency at f and has two frequency components corresponding to "1" and "0", respectively. The FSK signal S1 is demodulated by the mixers 44 and 45 to be converted to the I and Q baseband signals $S_I$ and $S_Q$ having a baseband frequency. Further, the I and Q baseband signals $S_I$ and $S_Q$ modulate the second local oscillation signal by the mixers 52 and 53 are converted to the second FSK signal S2. The second FSK signal S2 has a center intermediate-frequency frequency at $f_{LO2}$ and has two frequency components corresponding to "1" and "0", respectively.

As described above, the automatic frequency control circuit according to the present invention converts the second FSK signal S2 into a voltage $V_{RCV}$ by the f/V convert 108. The local-oscillation frequency is controlled so the output voltage $V_{RCV}$ of the f/V converter converges in a window width in which the upper- and lower-limit voltages corresponding to positive/negative frequency shift are set on the basis of the reference voltage corresponding to the center frequency of the second FSK signal. Therefore, it is unnecessary to use an integrator or voltage averaging means for the output voltage of the f/V converter and thus, it is possible to converge the local-oscillation frequency of the local oscillator at a high speed. Further, it is possible to perform the precise AGC operation even when the received signals $V_{RCV}$ alternates 1 and 0 non-uniformly.

What is claimed is:

1. An automatic frequency control circuit for controlling an oscillation frequency of a local oscillator provided in an FSK (frequency shift keying) signal receiver, comprising:

a converter for converting a frequency of an FSK signal to a received signal voltage varying depending on the frequency of the FSK signal;

a window generator for generating a voltage window including a reference voltage corresponding to a center frequency of the FSK signal; and a controller for changing the oscillation frequency of the local oscillator whenever the received signal voltage deviates outside of the voltage window, such that the received signal voltage returns back into the voltage window.

2. The automatic frequency control circuit according to claim 1, wherein the window generator generates an upper-limit voltage and a lower-limit voltage which define the voltage window having the reference voltage at a center thereof, wherein the upper-limit voltage corresponds to a positive frequency shift and the lower-limit voltage corresponds to a negative frequency shift with respect to the center frequency of the FSK signal.

3. The automatic frequency control circuit according to claim 1, wherein the FSK signal receiver is a superheterodyne receiver.

4. The automatic frequency control circuit according to claim 3, wherein the superheterodyne receiver comprises a frequency converter for converting a radio-frequency FSK signal to the FSK signal by mixing the radio-frequency FSK signal with a local oscillation signal generated by the local oscillator.

5. The automatic frequency control circuit according to claim 1, wherein the FSK signal receiver is a direct-conversion receiver.

6. The automatic frequency control circuit according to claim 1, wherein the controller changes the oscillation frequency of the local oscillator using a continuous signal.

7. The automatic frequency control circuit according to claim 1, wherein the controller changes the oscillation frequency of the local oscillator using a discrete signal.

8. An automatic frequency control circuit for controlling an oscillation frequency of a local oscillator provided in an FSK signal receiver, comprising:
   a converter for converting a frequency of an FSK signal to a received signal voltage varying depending on the frequency of the FSK signal;
   a window generator for generating a voltage window including a reference voltage corresponding to a center frequency of the FSK signal; and
   a controller for changing the oscillation frequency of the local oscillator whenever the received signal voltage deviates outside of the voltage window, such that the received signal voltage returns back into the voltage window,
      wherein the window generator generates an upper-limit voltage and a lower-limit voltage which define the voltage window having the reference voltage at a center thereof,
      wherein the upper-limit voltage corresponds to a positive frequency shift and the lower-limit voltage corresponds to a negative frequency shift with respect to the center frequency of the FSK signal,
      wherein the window generator further comprises a series circuit connected between a power supply line and a grounding line of a first constant-current source, a first resistor, a second resistor, and a second constant-current source, and
      wherein the reference voltage is applied to a connection point of the first and second resistors, the upper-limit voltage is generated at a connection point of the first constant-current source and the first resistor and the lower-limit voltage is generated at a connection point of the second resistor and the second constant-current source.

9. An automatic frequency control circuit for controlling an oscillation frequency of a local oscillator provided in an FSK (frequency shift keying) signal receiver, comprising:
   a converter for converting a frequency of an FSK signal to a received signal voltage varying depending on the frequency of the FSK signal;
   a window generator for generating a voltage window including a reference voltage corresponding to a center frequency of the FSK signal; and
   a controller for changing the oscillation frequency of the local oscillator whenever the received signal voltage deviates outside of the voltage window, such that the received signal voltage returns back into the voltage window,
      wherein the window generator generates an upper-limit voltage and a lower-limit voltage which define the voltage window having the reference voltage at a center thereof,
      wherein the upper-limit voltage corresponds to a positive frequency shift and the lower-limit voltage corresponds to a negative frequency shift with respect to the center frequency of the FSK signal, and
      wherein the controller further comprises:
         a first converter for converting a difference between the received signal voltage and the upper-limit voltage to a charging current when the received signal voltage is higher than the upper-limit voltage;
         a second converter for converting a difference between the received signal voltage and the lower-limit voltage to a discharging current when the received signal voltage is lower than the lower-limit voltage; and
         a capacitor connected to the first and second converters to be charged by the charging current and to be discharged by the discharging current to produce a frequency control voltage that is output to the local oscillator.

10. An automatic frequency control circuit for controlling an oscillation frequency of a local oscillator provided in an FSK (frequench shift keying) signal receiver, comprising:
    a converter for converting a frequency of an FSK signal to a received signal voltage varying depending on the frequency of the FSK signal;
    a window generator for generating a voltage window including a reference voltage corresponding to a center frequency of the FSK signal; and
    a controller for changing the oscillation frequency of the local oscillator whenever the received signal voltage deviates outside of the voltage window, such that the received signal voltage returns back into the voltage window,
       wherein the window generator generates an upper-limit voltage and a lower-limit voltage which define the voltage window having the reference voltage at a center thereof,
       wherein the upper-limit voltage corresponds to a positive frequency shift and the lower-limit voltage corresponds to a negative frequency shift with respect to the center frequency of the FSK signal, and
       wherein the controller further comprises:
          a first constant-current source for generating a charging current when the received signal voltage is higher than the upper-limit voltage,
          a second constant-current source for generating a discharging current when the received signal is lower than the lower-limit voltage; and
          a capacitor connected to a connection point of the first and second constant-current sources to be charged by the charging current and to be discharged by the discharging current to produce a frequency control voltage that is output to the local oscillator.

11. An automatic frequency control circuit for controlling an oscillation frequency of a local oscillator provided in an FSK (frequency shift keying) signal receiver, comprising:
    a converter for converting a frequency of an FSK signal to a received signal voltage varying depending on the frequency of the FSK signal;
    a window generator for generating a voltage window including a reference voltage corresponding to a center frequency of the FSK signal; and
    a controller for changing the oscillation frequency of the local oscillator whenever the received signal voltage deviates outside of the voltage window, such that the received signal voltage returns back into the voltage window, wherein the window generator generates an upper-limit voltage and a lower-limit voltage which define the voltage window having the reference voltage at a center thereof.

wherein the upper-limit voltage corresponds to a positive frequency shift and the lower-limit voltage corresponds to a negative frequency shift with respect to the center frequency of the FSK signal, and wherein the controller further comprises:

a first amplifier for generating a differential pair of charging current depending on a difference between the received signal voltage and the upper-limit voltage when the received signal voltage is higher than the upper-limit voltage;

a second amplifier for generating a differential pair of discharging currents depending on a difference between the received signal voltage and the lower-limit voltage when the received signal voltage is lower than the lower-limit voltage; and a capacitor connected to the first and second amplifiers to be charged by the differential pair of charging currents and to be discharged by the differential pair of discharging currents to produce a frequency control voltage that is output to the local oscillator.

12. An automatic frequency control circuit for controlling an oscillation frequency of a local oscillator provided in an FSK (frequency shift keying) signal receiver, comprising:

a converter for converting a frequency of an FSK signal to a received signal voltage varying depending on a the frequency of the FSK signal;

a window generator for generating a voltage window including a reference voltage corresponding to a center frequency of the FSK signal; and a controller for changing the oscillation frequency of the local oscillator whenever the received signal voltage deviates outside of the voltage window, such that the received signal voltage returns back into the voltage window, wherein the window generator generates a first upper-limit voltage, a second upper-limit voltage higher than the first upper-limit voltage, a first lower-limit voltage and a second lower-limit voltage lower than the first lower-limit voltage, the first upper-limit voltage and the first lower-limit voltage defining the voltage window having the reference voltage at a center thereof, wherein the first and second upper-limit voltages correspond to a positive frequency shift and the first and second lower-limit voltages correspond to a negative frequency shift with respect to the center frequency of the FSK signal.

13. The automatic frequency control circuit according to claim 12, wherein the window generator comprises a series circuit connected between a power supply line and a grounding line of a first constant-current source, a first resistor, a second resistor, a third resistor, a fourth resistor, and a second constant-current source, wherein the reference voltage is applied to a connection point of the second and third resistors, the first upper-limit voltage is generated at a connection point of the first and second resistors, the second upper-limit voltage is generated at a connection point of the first constant-current source and the first resistor, the first lower-limit voltage is generated at a connection point of the third and fourth resistors, and the second lower-limit voltage is generated at a connection point of the second resistor and the second constant-current source.

14. The automatic frequency control circuit according to claim 12, wherein the controller comprises:

a first constant-current source for generating a first charging current when the received signal voltage is higher than the second upper-limit voltage;

a second constant-current source for generating a second charging current when the received signal voltage is higher than the first upper-limit voltage;

a third constant-current source for generating a first discharging current when the received signal voltage is lower than the first lower-limit voltage;

a fourth constant-current source for generating a second discharging current when the received signal voltage is lower than the second lower-limit voltage; and a capacitor connected to both a first connection point of the first and fourth constant-current sources and a second connection point of the second and third constant-current sources to be charged by the first and second charging current and to be discharged by the first and second discharging current to produce a frequency control voltage that is output to the local oscillator.

15. An automatic frequency control circuit for controlling an oscillation frequency of a local oscillator provided in an FSK (frequency shift keying) signal receiver, comprising:

a converter for converting a frequency of an FSK signal to a received signal voltage varying depending on the frequency of the FSK signal;

a window generator for generating a voltage window including a reference voltage corresponding to a center frequency of the FSK signal; and a controller for changing the oscillation frequency of the local oscillator whenever the received signal voltage deviates outside of the voltage window, such that the received signal voltage returns back into the voltage window.

wherein the FSK signal receiver is a direct-conversion receiver, and wherein the direct-conversion receiver further comprises:

a quadrature detector for detecting quadrature baseband signals from radio-frequency FSK signal by mixing the radio-frequency FSK signal with a local oscillation signal generated by the local oscillator and a $\pi/2$-shift local oscillation signal generated from the local oscillation signal; and an up converter for converting the quadrature baseband signals to the FSK signal.

16. An automatic frequency control method for controlling an oscillation frequency of a local oscillator provided in an FSK (frequency shift keying) signal receiver, comprising:

converting a frequency of an FSK signal to a received signal voltage;

generating a voltage window including a reference voltage corresponding to a center frequency of the FSK signal; and changing the oscillation frequency of the local oscillator whenever the received signal voltage deviates outside the voltage window, such that the received signal voltage returns back into the voltage window.

17. The automatic frequency control method according to claim 16, wherein in generating said voltage window, an upper-limit voltage and a lower-limit voltage are generated which define the voltage window having the reference voltage at a center thereof, and said upper-limit voltage corresponds to a positive frequency shift and said lower-limit voltage corresponds to a negative frequency shift with respect to the center frequency of the FSK signal.

18. The automatic frequency control method according to claim 16, wherein the FSK signal receiver is a superheterodyne receiver.

19. The automatic frequency control method according to claim 18, wherein the superheterodyne receiver comprises a frequency converter for converting a radio-frequency FSK signal to the FSK signal by mixing the radio-frequency FSK signal with a local oscillation signal generated by the local oscillator.

20. The automatic frequency control method according to claim 16, wherein the FSK signal receiver is a direct-conversion receiver.

21. The automatic frequency control method according to claim 16, wherein for the oscillation frequency change, the oscillation frequency of the local oscillator is changed using a continuous signal.

22. The automatic frequency control method according to claim 16, wherein for the oscillation frequency change, the oscillation frequency of the local oscillator is changed using a discrete signal.

23. An automatic frequency control method for controlling an oscillation frequency of a local oscillator provided in an FSK (frequency shift keying) signal receiver, comprising:
   converting a frequency of an FSK signal to a received signal voltage;
   generating a voltage window including a reference voltage corresponding to a center frequency of the FSK signal; and
   changing the oscillation frequency of the local oscillator whenever the received signal voltage deviates outside the voltage window, such that the received signal voltage returns back into the voltage window, wherein
   in generating said voltage window, an upper-limit voltage and a lower-limit voltage are generated which define the voltage window having the reference voltage at a center thereof, and said upper-limit voltage corresponds to a positive-frequency shift and said lower-limit voltage corresponds to a negative frequency shift with respect to the center frequency of the FSK signal, and
   said voltage window generation further comprises:
      flowing a current through a series circuit connected between a power supply line and a grounding line of a first constant-current source, a first resistor, a second resistor, and a second constant-current source;
      applying the reference voltage to a connection point of the first and second resistors;
      generating the upper-limit voltage at a connection point of the first constant-current source and the first resistor; and
      generating the lower-limit voltage at a connection point of the second resistor and the second constant-current source.

24. An automatic frequency control method for controlling an oscillation frequency of a local oscillator provided in an FSK (frequency shift keying) signal receiver, comprising:
   converting a frequency of an FSK signal to a received signal voltage;
   generating a voltage window including a reference voltage corresponding to a center frequency of the FSK signal; and
   changing the oscillation frequency of the local oscillator whenever the received signal voltage deviates outside the voltage window, such that the received signal voltage returns back into the voltage window, wherein
   in generating said voltage window, an upper-limit voltage and a lower-limit voltage are generated which define the voltage window having the reference voltage at a center thereof, and said upper-limit voltage corresponds to a positive-frequency shift and said lower-limit voltage corresponds to a negative frequency shift with respect to the center frequency of the FSK signal,
   wherein the changing of the oscillation frequency further comprises:
      converting a difference between the received signal voltage and the upper-limit voltage to a charging current when the received signal voltage is higher than the upper-limit voltage;
      converting a difference between the received signal voltage and the lower-limit voltage to a discharging current when the received signal voltage is lower than the lower-limit voltage; and
      producing a frequency control voltage to be output to the local oscillator by charging a capacitor with the charging current and discharging the capacitor with the discharging current.

25. An automatic frequency control method for controlling an oscillation frequency of a local oscillator provided in an FSK (frequency shift keying) signal receiver, comprising:
   converting a frequency of an FSK signal to a received signal voltage;
   generating a voltage window including a reference voltage corresponding to a center frequency of the FSK signal; and
   changing the oscillation frequency of the local oscillator whenever the received signal voltage deviates outside the voltage window, such that the received signal voltage returns back into the voltage window, wherein
   in generating said voltage window, an upper-limit voltage and a lower-limit voltage are generated which define the voltage window having the reference voltage at a center thereof, and said upper-limit voltage corresponds to a positive-frequency shift and said lower-limit voltage corresponds to a negative frequency shift with respect to the center frequency of the FSK signal, and
   wherein the changing of the oscillation frequency further comprises:
      generating a charging current when the received signal voltage is higher than the upper-limit voltage;
      generating a discharging current when the received signal voltage is lower than the lower-limit voltage; and
      producing a frequency control voltage to be output to the local oscillator by charging a capacitor with the charging current and discharging the capacitor with the discharging current.

26. An automatic frequency control method for controlling an oscillation frequency of a local oscillator provided in an FSK (frequency shift keying) signal receiver, comprising:
   converting a frequency of an FSK signal to a received signal voltage;
   generating a voltage window including a reference voltage corresponding to a center frequency of the FSK signal; and
   changing the oscillation frequency of the local oscillator whenever the received signal voltage deviates outside the voltage window, such that the received signal voltage returns back into the voltage window, wherein
   in generating said voltage window, an upper-limit voltage and a lower-limit voltage are generated which define the voltage window having the reference voltage at a center thereof, and said upper-limit voltage corresponds to a positive-frequency shift and said lower-limit voltage corresponds to a negative frequency shift with respect to the center frequency of the FSK signal, wherein the changing of the oscillation frequency further comprises:
  generating a differential pair of charging currents depending on a difference between the received signal voltage and the upper-limit voltage when the received signal voltage is higher than the upper-limit voltage;
  generating a differential pair of discharging currents depending on a difference between the received signal voltage and the lower-limit voltage when the received signal voltage is lower than the lower-limit voltage; and
  producing a frequency control voltage to be output to the local oscillator by charging a capacitor with the differential pair of charging currents and discharging the capacitor with the differential pair of discharging currents.

27. An automatic frequency control method for controlling an oscillation frequency of a local oscillator provided in an FSK (frequency shift keying) signal receiver, comprising:
  converting a frequency of an FSK signal to a received signal voltage;
  generating a voltage window including a reference voltage corresponding to a center frequency of the FSK signal; and
  changing the oscillation frequency of the local oscillator whenever the received signal voltage deviates outside the voltage window, such that the received signal voltage returns back into the voltage window,
  wherein in generating said voltage window, a first upper-limit voltage, a second upper-limit voltage higher than the first upper-limit voltage, a first lower-limit voltage and a second lower-limit voltage lower than the first lower-limit voltage are generated, the first upper-limit voltage and the first lower-limit voltage defining the voltage window having the reference voltage at a center thereof, wherein the first and second upper-limit voltages correspond to a positive frequency shift and the first and second lower-limit voltages correspond to a negative frequency shift with respect to the center frequency of the FSK signal.

28. The automatic frequency control method according to claim 27, wherein the voltage window generation further comprises:
  flowing a current through a series circuit connected between a power supply line and a grounding line of a first constant-current source, a first resistor, a second resistor, a third resistor, a fourth resistor, and a second constant-current source;
  applying the reference voltage to a connection point of the second and third resistors;
  generating the first upper-limit voltage at a connection point of the first and second resistors;
  generating the second upper-limit voltage at a connection point of the first constant-current source and the first resistor;
  generating the first lower-limit voltage at a connection point of the third and fourth resistors; and
  generating the second lower-limit voltage at a connection point of the second resistor and the second constant-current source.

29. The automatic frequency control method according to claim 28, wherein the changing of the oscillation frequency further comprises:
  generating a first charging current when the received signal voltage is higher than the second upper-limit voltage;
  generating a second charging current when the received signal voltage is higher than the first upper-limit voltage,
  generating a first discharging current when the received signal is lower than the first lower-limit voltage;
  generating a second discharging current when the received signal voltage is lower than the second lower-limit voltage; and
  producing a frequency control voltage to be output to the local oscillator by charging a capacitor with the first and second charging currents and discharging the capacitor with the first and second discharging currents.

30. An automatic frequency control method for controlling an oscillation frequency of a local oscillator provided in an FSK (frequency shift keying) signal receiver, comprising:
  converting a frequency of an FSK signal to a received signal voltage;
  generating a voltage window including a reference voltage corresponding to a center frequency of the FSK signal; and
  changing the oscillation frequency of the local oscillator whenever the received signal voltage deviates outside the voltage window, such that the received signal voltage returns back into the voltage window,
  wherein the FSK signal receiver is a direct-conversion receiver, and
  wherein the direct-conversion receiver further comprises:
    a quadrature detector for detecting quadrature baseband signals from a radio-frequency FSK signal by mixing the radio-frequency FSK signal with a local oscillation signal generated by the local oscillator and a$\pi$/2-shift local oscillation signal generated from the local oscillation signal; and
    an up converter for converting the quadrature baseband signals to the FSK signal.

31. An automatic frequency control circuit for controlling a receiver local oscillator, comprising:
  a frequency-to-voltage converter for converting a received signal frequency to a received signal voltage;
  a generator for generating a predetermined voltage window; and
  a controller for changing the oscillation frequency of the local oscillator whenever the received signal voltage deviates outside of the voltage window.

32. A method for controlling a local oscillator in a receiver, comprising:
  converting a received signal frequency to a received signal voltage;
  generating a voltage window having a predetermined lower limit voltage and a predetermined upper limit voltage; and
  controlling the local oscillator based on how much the received signal voltage either deviates above the upper limit voltage or deviates below the lower limit voltage.

33. An automatic frequency control circuit for controlling a receiver local oscillator comprising:
  at least one pair of constant current sources; and
  at least one pair of differential amplifiers, such that said current sources and said differential amplifiers comprise a voltage window deviation circuit wherein deviation is the amount of deviation outside said voltage window and wherein said deviation changes a frequency of said local oscillator to drive said deviation back to zero.

* * * * *